Aug. 7, 1956  A. F. LUTHI ET AL  2,757,845
APPARATUS FOR FILLING RECEPTACLES
Filed Feb. 2, 1952  8 Sheets-Sheet 1
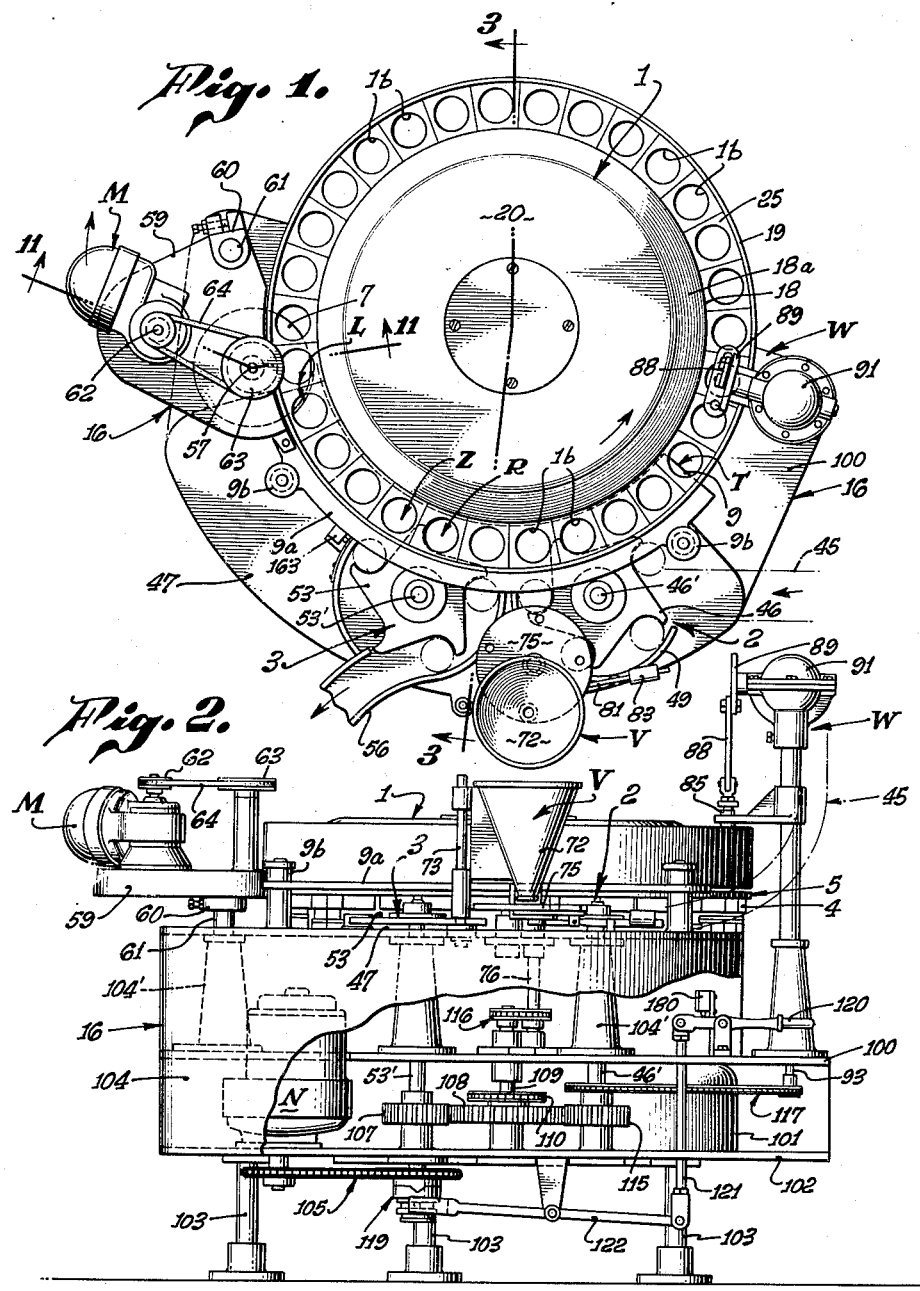
INVENTORS.
ALFRED F. LUTHI,
ALOIS G. LUTHI,
BY Paul A. Weilein
ATTORNEY.

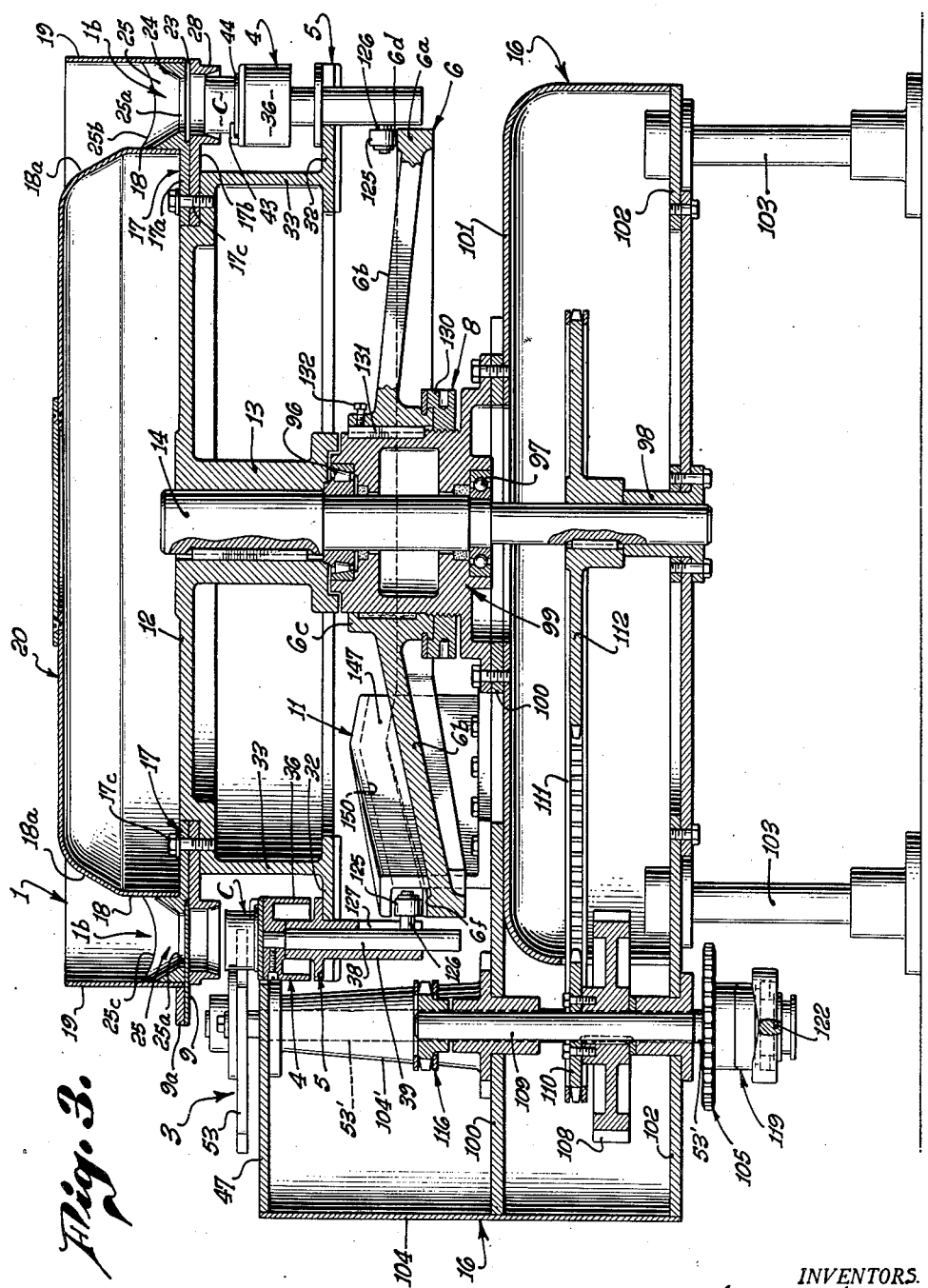

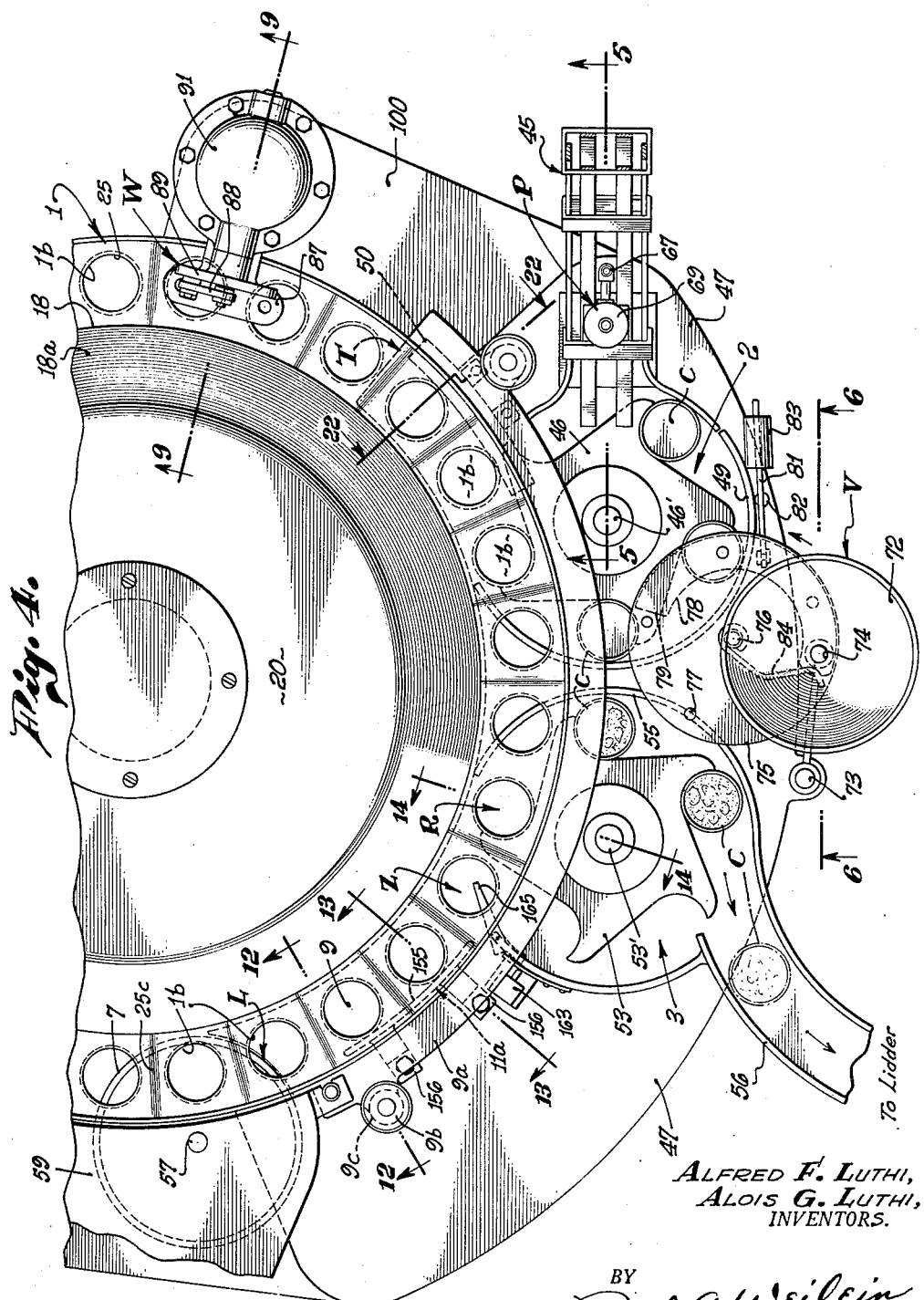

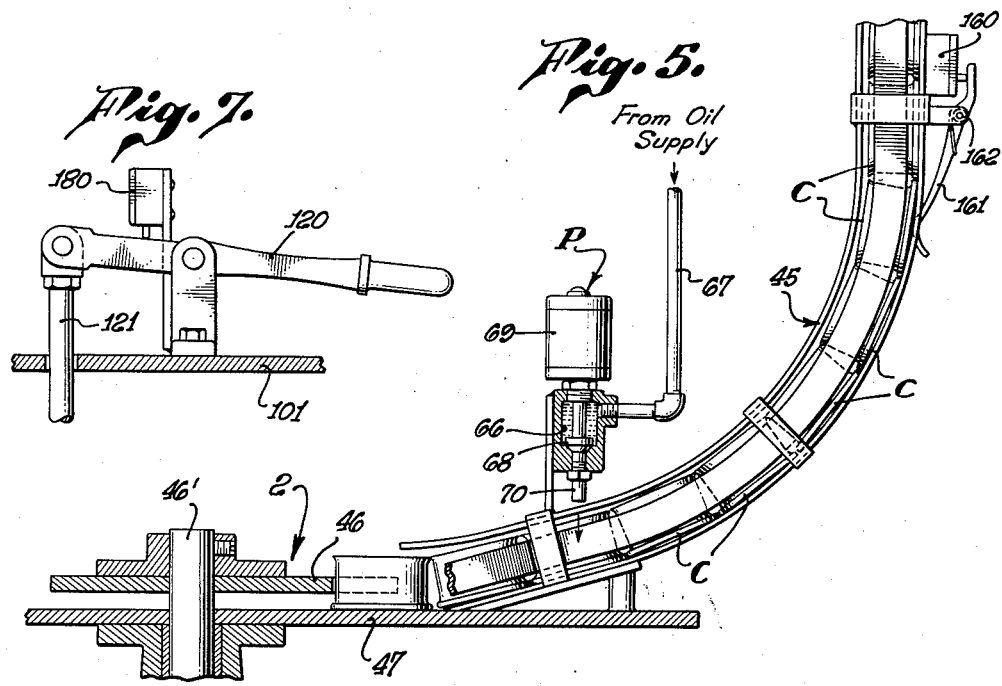
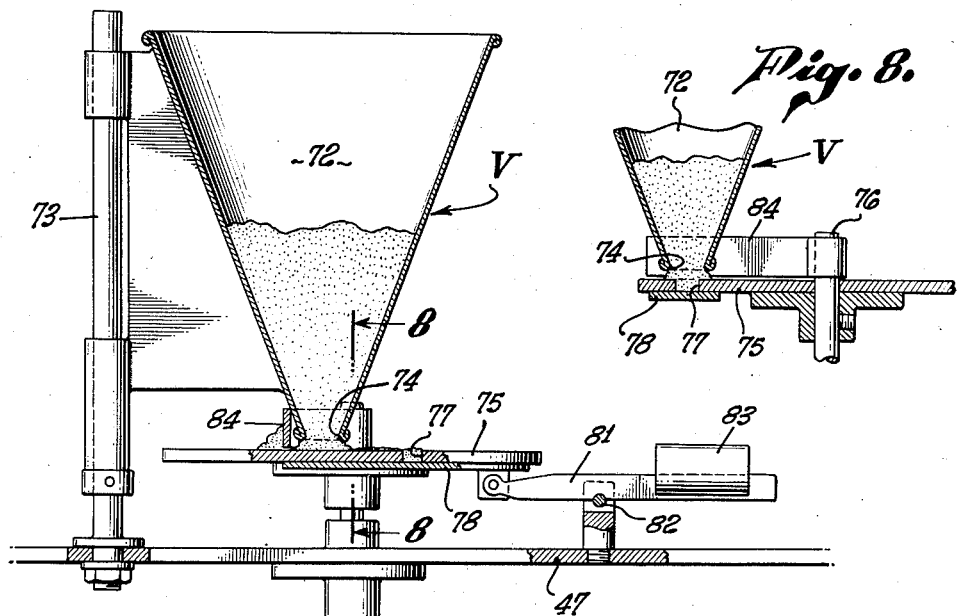

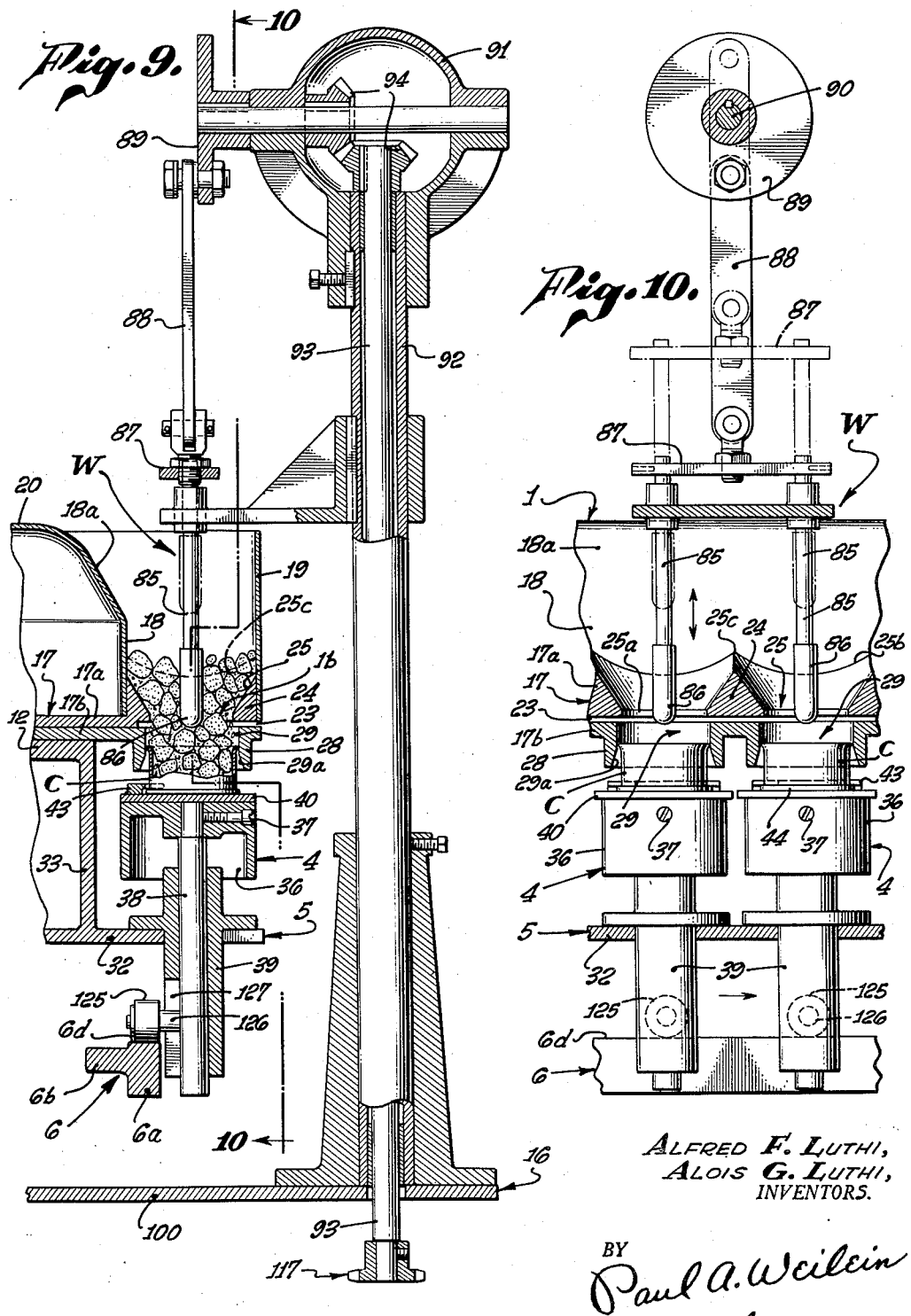

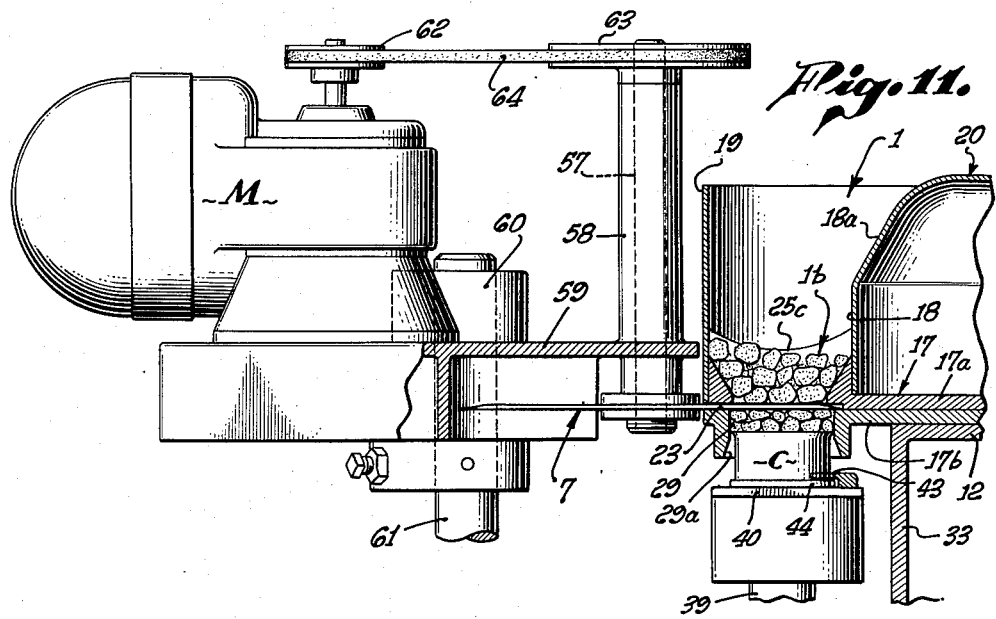
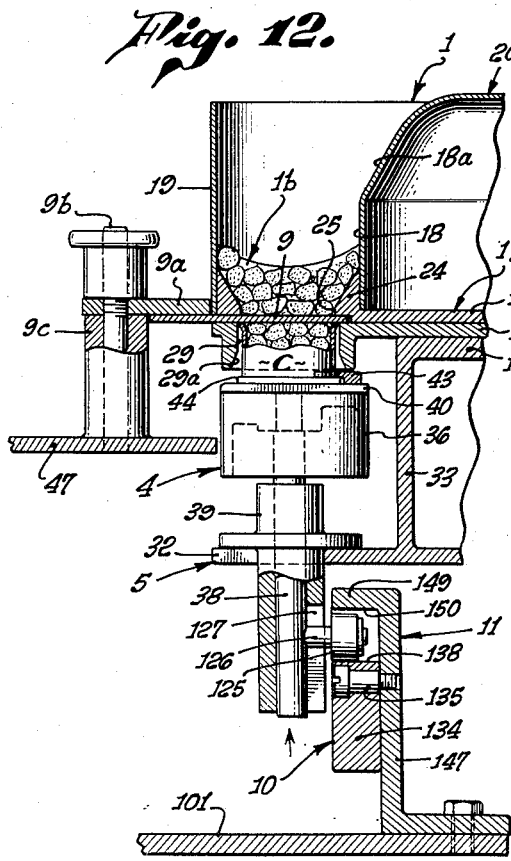
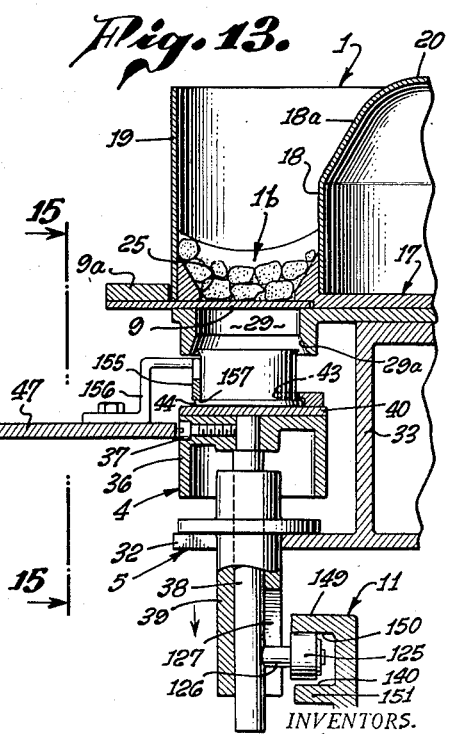

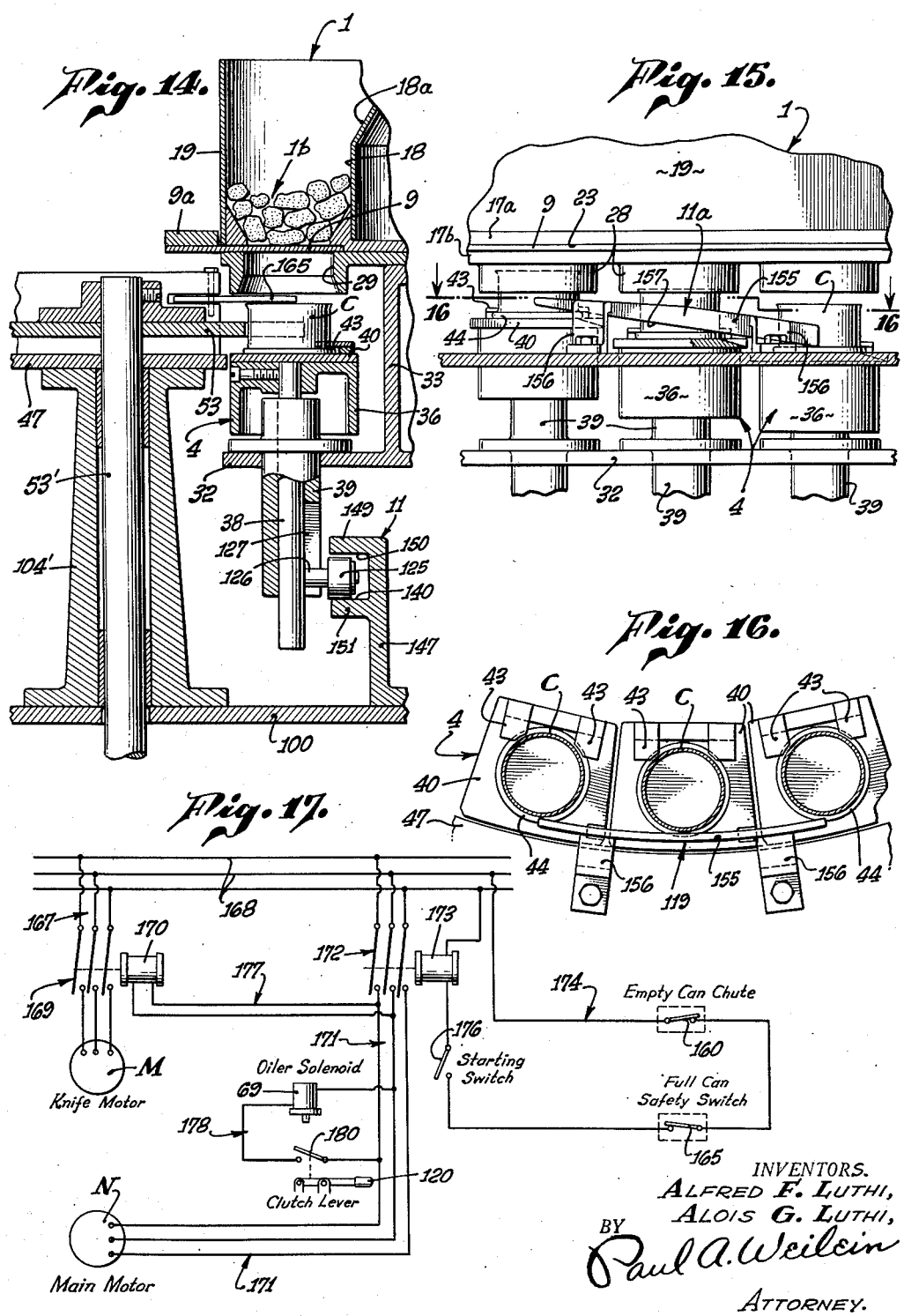

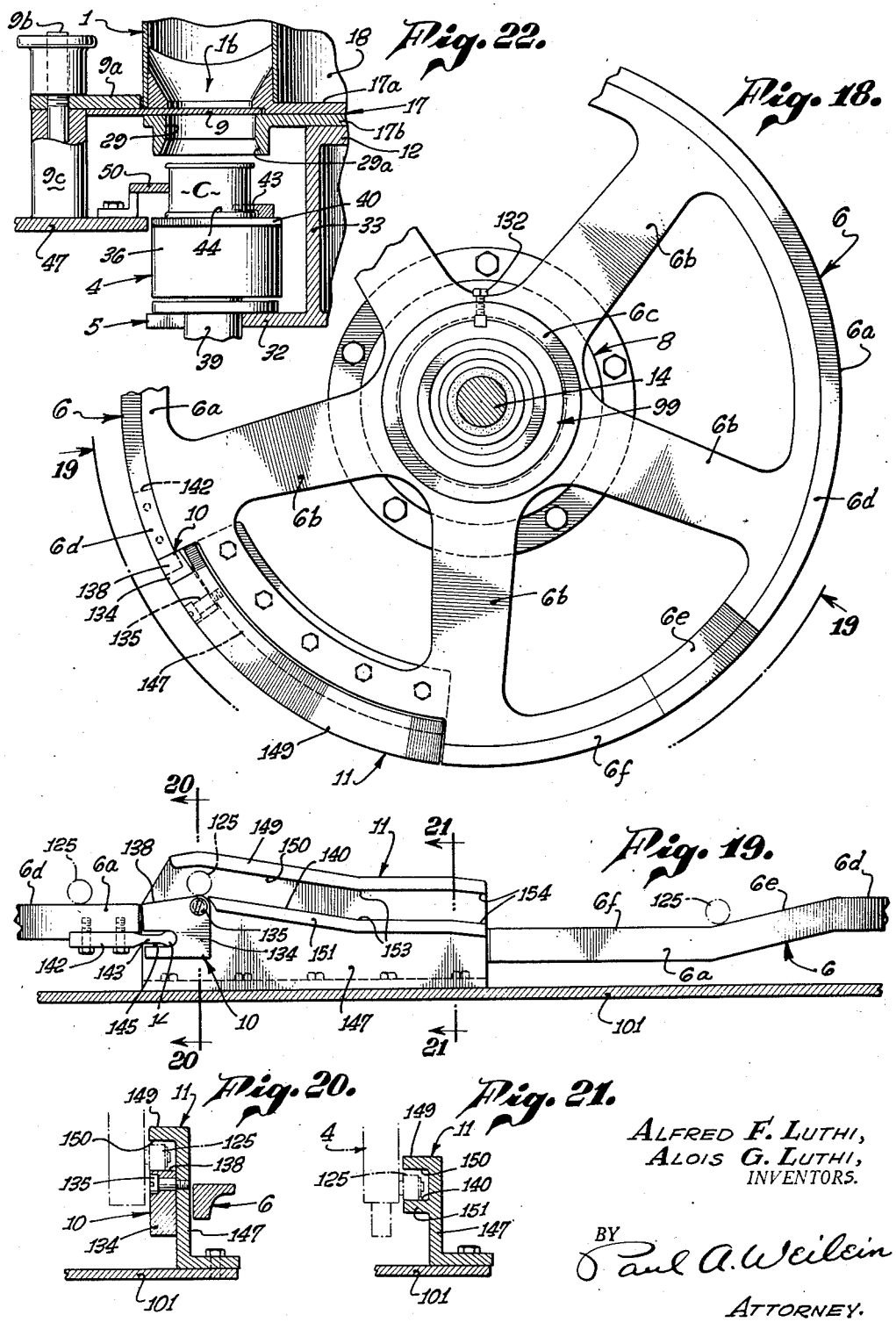

United States Patent Office 2,757,845
Patented Aug. 7, 1956

2,757,845
APPARATUS FOR FILLING RECEPTACLES
Alfred F. Luthi, Los Angeles, and Alois G. Luthi, Gardena, Calif.
Application February 2, 1952, Serial No. 269,642
41 Claims. (Cl. 226—97)

This invention relates to apparatus for filling receptacles with food or other commodities, and more particularly to apparatus for packing fish in receptacles, such as cans.

In the machine packing of certain foods, particularly fish, it is desirable for some packs, to avoid mutilation or breaking up of the pieces of food or fish which are intended to reach the consumer in whole form of predetermined sizes.

In packing fish, particularly the tuna species, one form of pack that is in popular demand, consists of whole pieces of the fish "loins" cut into chunks of predetermined size and free from mutilated end and side surfaces as well as any other disfigurement.

Attempts have been made to produce this solid or chunk pack of fish by machine rather than by the usual hand packing methods. However, these machines have failed to produce a pack sufficiently free from mutilated or broken up pieces to be comparable in quality to hand packs, due to the manner in which the machines forcibly handle and agitate the fish in the operation of metering, filling and packing the cans.

It is therefore an object of this invention to provide a filling machine which will minimize mutilation and breaking up of the pieces of food or fish of the desired size and form, thereby producing a pack of the desired quality.

It is another object of this invention to provide apparatus for filling receptacles wherein the volume and weight of the pack for each receptacle is controlled by adjusting the relative position of the receptacles and a movable hopper containing the material to be packed.

It is another object of this invention to provide filling apparatus of the character described, wherein the filling material, after being deposited in a movable hopper, is automatically metered therein and deposited in the receptacles while the latter are positioned within the hopper, without appreciably shifting the material from the position it occupies when initially deposited in the hopper. Thus, the amount of movement, the handling and the agitation of the material in the filling of the receptacles are reduced to the extent that the tendency of mutilating or breaking up the whole pieces or chunks of the material is minimized.

It is another object of this invention to provide a machine of the character described wherein the adjustment to regulate the volume and weight of the pack for each receptacle may be effected during operation of the machine.

It is another object of this invention to provide apparatus of the character described wherein a movable hopper, a knife, a pressure plate and a movable receptacle carrier are constructed and arranged to achieve the purposes herein stated in a particularly efficacious manner.

It is another object of this invention to provide a novel and improved device by which predetermined charges of discriminate pieces of material may be successively filled into successive receptacles continuously moving through the apparatus.

It is an additional object to provide for the continuous filling of receptacles with predetermined chunks without the use of preliminary charge forming devices which exert pressure on the chunks.

Other objects include that of providing means for supplying additional ingredients such as oil and salt in metered quantities to each receptacle independently of the supply thereto of the major filling material, providing synchronous and interdependent operation of cooperating instrumentalities so each unit operates in harmony with associated devices, and providing simple and unified drive and control of the whole apparatus as well as providing safety devices to automatically terminate operations upon failure of proper supply of receptacles or the misalignment thereof in the apparatus.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a top plan view of one form of apparatus embodying the present invention;

Fig. 2 is a side elevation partly broken away of the apparatus shown in Fig. 1;

Fig. 3 is a sectional view on an enlarged scale, taken on the line 3—3 of Fig. 1;

Fig. 4 is an enlarged fragmentary top plan view of the front portion of the device shown in Figs. 1 and 2;

Fig. 5 is a detailed sectional view taken on the line 5—5 of Fig. 4, showing the receptacle feed and oil supplying means of the present invention;

Fig. 6 is a detail sectional view taken on the line 6—6 of Fig. 4, showing the salt feeding means of the present invention;

Fig. 7 is a detail elevation of a preferred control mechanism for the machine;

Fig. 8 is a section taken on the line 8—8 of Fig. 6;

Fig. 9 is an enlarged sectional view taken on the line 9—9 of Fig. 4, showing the packing assistance mechanism of the device;

Fig. 10 is a sectional view taken on the line 10—10 of Fig. 9;

Fig. 11 is an enlarged sectional view taken on the line 11—11 of Fig. 1, showing the knife and its operating means;

Fig. 12 is an enlarged sectional view taken on the line 12—12 of Fig. 4 showing the manner in which the charge is pressed into the cans after the operation of the knife;

Fig. 13 is an enlarged sectional view taken on the line 13—13 of Fig. 4, showing the manner in which the filled cans are retracted from position shown in Fig. 12;

Fig. 14 is an enlarged sectional view taken on the line 14—14 of Fig. 4, showing the can-discharging mechanism;

Fig. 15 is a fragmentary sectional view taken on the line 15—15 of Fig. 13;

Fig. 16 is a fragmentary sectional view taken on the line 16—16 of Fig. 15;

Fig. 17 is a diagrammatic view of the electrical circuits and control switches embodied in the machine;

Fig. 18 is a fragmentary top plan view of the adjustable cam;

Fig. 19 is a developed view of that portion of the cam embraced by the line 19—19 of Fig. 18;

Fig. 20 is a detail section taken on the line 20—20 of Fig. 19;

Fig. 21 is a similar view taken on the line 21—21 of Fig. 19; and

Fig. 22 is a fragmentary sectional view taken on line 22—22 of Fig. 4.

In general, one embodiment of this invention includes a movable hopper 1 having a series of discharge openings forming relatively deep, open pockets or cups 1b for containing the filling material.

The filling material is discharged from the pockets 1b into receptacles C continuously fed to and removed from the machine by feed means 2 and take-off means 3, respectively. Any suitable means, not shown, may be employed for feeding the filling material into the hopper pockets 1b.

The feed means 2 deposits the receptacles C onto individual and reciprocable receptacle-supporting members 4 forming parts of a carrier 5 joined to the hopper 1 for movement therewith, this movement, as here shown, being rotational in a counterclockwise direction about a vertical axis.

A non-rotatable but vertically adjustable cam 6 operates the members 4 to uniformly position the receptacles C within the pockets 1b of the hopper 1, whereby during rotation of the hopper and members 4, the filling material will be gravitationally discharged from the pockets into the receptacles.

A knife 7 is positioned in the path of movement of the pockets 1b and filled receptacles therein, so that each pocket passing the knife will be intersected at a given plane above the upper end of the filled receptacle therein. Thus, the knife 7 will cut across the material contained above the top of the filled receptacle in each pocket 1b passing the knife, thereby providing a uniform, but surplus filling for each receptacle, this surplus depending upon the spacing of the upper open ends of the receptacle from the knife.

Adjusting means 8 is operable to adjust the cam 6 for varying the position of the receptacles C in the pockets 1b with respect to the plane of the knife 7, whereby the volume of the filling for the receptacles may be varied. This adjustment may be effected while the machine is in operation.

As a means for shutting off the feed from the pockets 1b to the receptacles after the latter pass the knife 7 and for pressing the filling into the receptacles, a pressure plate 9 of limited extent projects from the knife 7 in the direction of advance of the receptacles from the knife, so as to extend into and across the pockets 1b above the filled receptacles therein. During their movement beneath the plate 9, the filled receptacles C are elevated by the receptacle supporting members 4 as operated by cam means 10, whereby the protruding portion of the filling will contact the under side of the plate 9 and be pressed into the receptacles.

As the filled receptacles C are advanced past the plate 9, they are successively lowered from the pockets 1b by the operation of cam means 11 and the receptacle supporting members 4, assisted by receptacle engaging cam means 11a, then successively removed from the carrier 5 by the take-off means 3.

The hopper 1 is constructed so that each pocket or cup 1b contains a greater quantity of filling material than required to fill a receptacle of given size. Thus, each pocket or cup 1b serves in effect as a hopper and, as a plurality of the receptacles are in filling position in the pockets over a long range of movement of the hopper before the knife 7 is encountered, the desired filling of each receptacle is assured with a minimum of movement and agitation of the material.

As the filling material is deposited into the rotating hopper 1, it immediately fills the pockets 1b and a measured quantity of the material is provided by the action of the knife 7 while the receptacles are positioned within the pockets. Thus, the filling of the receptacles taken place without requiring that the material be forcibly moved any great extent from the position that it occupied upon being initially deposited in the hopper. As a result of this arrangement, the movement and agitation of the filling material in the machine is reduced to such an extent that the tendency to mutilate or disfigure pieces of material of given size, is materially lessened.

The hopper

One of the important provisions of this invention, making it possible to fill the receptacles without mutilation of the filling material, is the continuously rotatable hopper 1 which with the receptacle carrier 5, forms a rotatable unit structure embodying a circular plate-like body portion 12 having a hub 13 keyed to a vertical shaft 14 journalled in a frame structure generally designated 16.

The hopper 1 is formed as an annular chamber at the outer periphery of the body portion 12, by means of an annular bottom wall 17 and concentric inner and outer annular side walls 18 and 19. The inner side wall 18 is a part of a circular hood 20 mounted over the body portion 12 to confine the storage space of the hopper to the annular space between the side walls 18 and 19. The upper portion of the side wall 18 is bevelled or inclined as at 18a to guide the filling material into the hopper pockets 1b.

As shown in Figs. 3, 11, 12 and 13, the bottom wall 17 supports the outer side wall 19 and is formed of two annular plate-like sections 17a and 17b mounted one upon the other and bolted as at 17c to the body portion 12. The upper section 17a is relieved or recessed on its lower surface so as to form between the two sections an outwardly opening slot 23 (Figs. 3, 10, 11 and 12) extending circumferentially of the hopper and transversely intersecting the hopper pockets 1b. This slot permits the knife 7 and plate 9 to extend into and across the pockets 1b during rotation of the hopper, as will be hereinafter more fully described.

As best shown in Figs. 3, 9 and 10, the pockets 1b are formed in the bottom wall sections 17a and 17b and are intersected intermediate their ends by the circumferential slots 23. Thus, the upper section 17a is provided with an upstanding circumferential enlargement 24 which fits snugly between the side walls 18 and 19 and is formed with a series of generally conical openings 25 having downwardly converging sides, constituting the upper portions of the pockets 1b. The openings 25 terminate at their lower ends in cylindrical portions 25a opening into the slot 23 (Fig. 10). The upper edges of the portions of the enlargement 24 which form the downwardly converging sides of the openings 25 are concavely curved as at 25b to conform to and lie close against the side walls 18 and 19. Fig. 10 shows how the curved edges 25b between the openings 25 merge into sharp edges or ridges 25c. These ridges and the close conformation of the curved edge 25b with the side walls 18 and 19 eliminate ledges on which the filling material would become lodged or restrained against gravitational movement in the pockets 1b. Thus, the filling material when deposited in any suitable manner into the hopper 1, that is, into the annular space between the side walls 18 and 19, readily will fill the pockets 1b without clogging or jambing in this space.

The lower portions of the pockets 1b are formed in a depending circumferential enlargement or boss 28 of the bottom wall section 17b by means of series of openings 29 aligned with the openings 25. The upper portions of the openings 29 are cylindrical and of somewhat greater diameter than the cylindrical portions 25a of the openings 25, whereas the lower portions of the openings 29, being the discharge ends of the pockets 1b, are enlarged and flared as at 29a whereby the receptacles C readily may be extended into and removed from the pockets 1b. Figs. 9 and 10 illustrate how the receptacles C, here shown as cans, are adapted to fit snugly but for free movement in the openings 29, the position of cans or receptacles C, as shown in Figs. 9 and 10, being typical for a desired filling of the cans, for example, with chunks of tuna fish.

Receptacle carrier

The receptacle or can carrier 5 primarily comprises a circular series of the receptacle supporting members 4 mounted for vertical reciprocation upon an annular plate-like flange 32 supported by a flange 33 depending from circular body portion 12 of the hopper. The members 4 are disposed below and in alignment with the pockets 1b and are identical as to construction. Thus, each member 4, as best shown in Figs. 9 and 10, comprises an inverted cup-shaped head 36 secured by means of a set screw 37 upon the upper end of a reciprocable shaft 38 slidable in a flanged tubular bearing 39 bolted or otherwise secured to the flange 32. A head plate 40 is suitably fixed to the upper end of the head 36 to form a receptacle supporting seat (Figs. 9, 10 and 16). As shown in Fig. 16, the head plates 40 are generally rectilinear except that the opposed edges thereof converge somewhat in a direction toward the axis of the carrier, whereby the plates may be closely spaced and will provide adequate receptacle-supporting surfaces assuring proper movement and positioning of the receptacles C relative thereto.

Means is provided for centering the receptacles C on the head plates 40 of the reciprocable supporting members 4, as shown in Fig. 16, so that the receptacles will be aligned with the openings 29 forming the lower portions of the pockets 1b. For this purpose the head plates 40 are provided with cleats 43 (Figs. 9, 10 and 16) which are spaced to embrace the sides of the receptacles and to overlie the flanges 44 on the lower ends of the receptacles.

Empty receptacle feed means 2

The receptacles C are gravitationally delivered by means of a conveyor chute 45 to the feed means 2, which latter includes a rotatable star wheel 46 mounted on a shaft 46' above a shelf 47 (Figs. 1, 4 and 5) supported by the frame 16. The receptacles C are deposited onto the shelf 47 against the star wheel 46 which moves the receptacles successively, by the aid of a guide rail 49 (Fig. 4) mounted on the shelf, onto the receptacle supporting members 4. The hopper 1 and carrier 5 rotate in timed relation to the rotation of the star wheel 46 whereby, as each of the receptacle supporting members 4 reaches a position past the end of the guide rail 49 (see Fig. 4), a receptacle will be deposited thereon by the star wheel. The means for driving the hopper-carrier unit and the star wheel 46 will be hereinafter fully described.

The star wheel 46 in moving a receptacle onto the head plate 40 of member 4, which is in position to receive a receptacle, will push the receptacle over the head plate against the cleats 43 thereon, thereby properly centering the receptacle. As the carrier advances the members 4 past the point of receiving receptacles, an arcuate guide rail 50 (Figs. 4 and 22) bolted to the shelf 47, engages the outer sides of the receptacles. This guide rail is of such length as to restrain the receptacles from movement out of centered position on the members 4 until the receptacles are elevated into the pockets 1b of the hopper, as will be hereinafter more fully described.

Pressure plate

For the purpose of shutting off the feed into the receptacles and pressing the filling material into the receptacles without mutilation thereof, the pressure plate 9 is employed. This plate is supported by a rim member 9a secured by fastenings 9b to posts 9c on the shelf 47, with the plate 9 extended into the hopper slot 23. An additional function of this plate is to prevent feed of the material through the hopper pockets 1b during movement of the feed of empty receptacles into the apparatus. Fig. 12 shows one of the members 4 and the receptacles C thereon in position to press the protruding portion of the filling into the receptacle.

Filled receptacle take-off means 3

In accordance with this invention the take-off means 3 for removing the filled receptacles from the carrier 5 is located close to the means 2 for feeding empty receptacles onto the carrier, whereby during the filling operation, the receptacles are moved on the carrier 5 for the greater part of a complete revolution, for example, approximately 300 degrees of arc. Accordingly, this take-off means comprises a star wheel 53 operable on a shaft 53' above the shelf 47 so as to extend between the carrier 5 and the hopper 1 at the zone indicated at R (Figs. 1 and 4). At this zone, the receptacles are withdrawn from the hopper pockets 1b, are successively moved by the star wheel 53 onto the shelf 47 aided by an arcuate guide rail 55 mounted on the shelf and extended beneath the hopper. From the shelf 47, the receptacles are moved into a chute conveyor 56 for feeding the receptacles to a sealing machine, not shown.

The rotary knife

An important feature of this invention is the rotary knife which assures a clean cutting of the surplus fillings and determines the volume of the fillings. Accordingly, the knife 7 is in the form of a circular blade mounted on a shaft 57 supported in an upright tubular bearing 58 on a bracket 59. This bracket is mounted, as at 60, for angular movement about the axis of a post 61 supported by the frame 16.

An electric motor M is supported on the bracket 59 and drives the shaft 57 through pulleys 62 and 63 and a belt 64. This knife unit is mounted so that the receptacles on the carrier will travel over at least 180° of arc from the point T where the filling operation commences, before the knife cuts through the filling material above the filled receptacles in the hopper pockets 1b. This assures an effective filling of the receptacles.

As shown in Fig. 4, the knife 7 enters the slot 23 in the hopper 1, at the leading edge L (Figs. 1 and 4) of the plate 9, whereby the filled receptacles will pass under the plate 9 upon leaving the knife. The knife 7 may be swung into and out of operative position as desired on the pivotal mounting 60.

It will be apparent that the amount of over-filling of the receptacles C, while in the pockets 1b of the hopper 1, depends upon the spacing of the open ends of the receptacles C from the plane of the portion of the knife extending into the slot 23 in the hopper. By adjusting the cam 6 in a manner which will be hereinafter more fully described, the spacing of the receptacles relative to the knife 7 may be varied.

Oil feed

Oil feeding means P is provided for depositing oil into the empty receptacles as they are conveyed by the feed chute 45 to the star wheel 46. Accordingly, as shown in Figs. 4 and 5, a valved chamber 66 is supported on the shelf 47 above the chute 45, and is connected by means of a pipe 67 with a source of supply of oil, not shown. The valve 68 in the chamber is controlled by means of a solenoid 69, the operation of which will be hereinafter fully described. When the valve 68 is opened, oil will drop through a spout 70 into the receptacles as they pass beneath the chamber 66.

Salt feed

Salt feeding means V operates to discharge metered quantities of salt into the empty receptacles as the latter are being advanced by the feed star wheel 46 over the shelf 47. Accordingly, as shown in Figs. 6 and 8, a supply of salt is placed in a conical hopper 72 swingably supported on a post 73 mounted on the shelf 47. The discharge opening 74 of the salt hopper 72 delivers salt onto a circular metering disk 75 mounted on and rotated by vertical shaft 76. A circular series of through openings 77 of predetermined size are formed in the disk 75 so as to be successively moved into registration with the discharge opening 74 of the hopper 72 and then successively moved into a position for depositing the salt contents thereof into the receptacles as the latter are being fed toward the carrier 5 by the star wheel 46. During movement of the openings 77 between the point where the salt is deposited therein and the point where the salt is discharged into receptacles, the lower ends of the openings 77 are closed by an arcuate closure plate 78 (Fig. 4). As the openings 77 move past the trailing end 79 of the plate 78, the contents of the openings drop into the containers C. The disk 75 is rotated, as will be hereinafter described, in timed relation to the operation of the star wheel 46. The plate 29 is yieldably held up against the lower side of the disk 75 by means of a lever 81 fulcrumed at 82 on the shelf 47 and actuated by a weight 83. A sweeper blade 84 lies upon the disk 75 and is formed to sweep excess salt into the openings 77 prior to registration of these openings with the discharge opening 74 of the hopper.

Feed assisting mechanism for the hopper

Feed assisting means W is provided for assuring the gravitational feed from the hopper pockets 1b into the receptacles as the hopper 1 is rotated. This means serves more particularly to prevent the filling material from clogging the pockets 1b rather than to act as plungers for forcing the material en masse. As shown in Figs. 9 and 10, this means comprises a plurality of fingers 85 of very small diameter compared to the diameter of the pockets 1b of the hopper, arranged to be rapidly moved into and out of the pockets 1b. Fig. 10 shows how these fingers are movable to loosen the pieces of filling material whereby the pieces will gravitate freely into the receptacles as the hopper 1 is rotated. The material contacting portions of the fingers 85 are in the form of flexible and soft tips 86 of rubber or the like to prevent mutilation of the pieces of filling material. As here shown, a pair of the fingers 85 depend from a reciprocable cross head 87 actuated by a link 88 pivoted to a crank 89. The crank 89 is mounted in a shaft 90 journalled in a housing 91 supported upon a tubular post 92 on the frame 16. The shaft 90 is driven from a vertical shaft 93 through gears 94, the shaft 93 being journalled in the post 92.

Main drive means

The main drive means includes the shaft 14 mounted as shown in Fig. 3, in bearings 96, 97 and 98. The bearing 96 and 97 are mounted in the upper and lower ends respectively of a hollow cylindrical casting 99 through which the shaft 14 extends. This casting is bolted to a horizontal frame plate 100 mounted upon a circular housing 101 in turn supported on a sectional base plate 102 mounted on legs 103. These parts, together with the columns 104' (see Fig. 2) supported on the plate 101, also an upright arcuate outer wall 104, secured to the plates 100 and 102 and to the shelf 47, from the frame 16 for the apparatus. The bearing 98 for the shaft 16 is located on the base plate 102.

An electric motor N mounted on the base plate 102 is operable to rotate the shaft 14 for simultaneously rotating the hopper 1 and carrier 5. This motor also drives the empty receptacle feed means 2, the filled receptacle take-off means 3, the salting mechanism V and the feed assisting means W. Accordingly, a chain and sprocket drive connection 105 is provided between the motor N and the vertical shaft 53' which drives the filled conveyor take-off star wheel 53 and is suitably journalled in the frame 16. A gear 107 on the shaft 53' meshes with a gear 108 keyed on a vertical idler shaft 109 suitably journalled in the frame 16. As shown in Fig. 3, the idler shaft 109 drives a sprocket 110 which, through a chain 111 and sprocket 112, drives the shaft 14 for rotating the hopper 1 and carrier 5 in a counterclockwise direction.

As shown in Fig. 2, the shaft 46' for driving the feed star wheel 46 is suitably journalled in the frame 16 and is driven by means of a gear 115 keyed thereon so as to mesh with the gear 108 on the idler shaft 109.

The shaft 76 for the salting mechanism V is driven by a chain and sprocket drive connection 116 between the shafts 109 and 76 as shown in Fig. 3.

As shown in Fig. 2, the shaft 93 for reciprocating the feed-assisting plungers 85, is driven by a sprocket and chain drive means 117 from the shaft 46' for the feed star wheel 46.

As shown in Fig. 2, a clutch 119 is operable on the shaft 53' in association with the sprocket drive means thereon, to control the drive means for the hopper 1 and carrier 5 also the other mechanism driven by the motor N. An operating lever 120 for actuating the clutch 119 is fulcrumed on the frame plate 101 and connected by means of a link 121 with a clutch operating lever 122 fulcrumed on the base plate 102.

Adjustable cam means 6

An important feature of the present invention is the cam means 6 for elevating the receptacles into the hopper pockets and maintaining them therein during the greater part of each revolution of the hopper and carrier. Accordingly, the cam means 6 as best seen in Figs. 3, 18 and 19 comprises an arcuate cam track 6a supported by spokes 6b radiating from a hub 6c mounted for vertical adjustment on the cylindrical casting 99 surrounding the shaft 14.

The cam track 6a has a dwell or high level surface 6d extending through more than 270 degrees of arc from an upwardly inclined cam portion 6e leading up to the dwell from a short track portion 6f. The portion 6f is joined to the portion 6e and disposed below the plane of the dwell 6d. Thus, the arcuate track 6a has a gap between its leading end and its trailing end, in which gap are positioned the cam means 10 and 11 in a manner which will be hereinafter fully described.

Cam followers 125 in the form of rollers are mounted on stub shafts 126 carried by the reciprocable shafts 38 of the receptacle supporting members 4. These stub shafts are slidable in slots 127 in the tubular bearings 39 whereby the followers 125 may ride upon the portions 6e and 6d of the cam track to elevate the member 4 with the receptacle C thereon so that the latter will be positioned in the hopper pockets 1b and so maintained while the followers ride upon the dwell portion 6d.

Cam adjustment means 8

As shown in Fig. 3, the hub 6c of the cam 6, rests upon an adjusting collar 130 threadedly mounted on the casting 99. The hub 6c is splined as at 131 on the casting, so that it is restrained against rotation. Upon appropriate turning of the collar 130, the cam may be raised to increase the lift of the receptacle supporting members 4, thereby disposing the receptacles in the pockets 1b nearer to the plane of the knife 7 for decreasing the surplus filling of the receptacles. Lowering of the cam 6 will increase the spacing of the receptacles from the plane of the knife 7 and increase the amount of the filling above the tops of the receptacles. The cam 6 may be held in adjusted position by means of a set screw 132.

Cam means 10 for elevating filled receptacles to pack surplus filling

This cam means is provided for causing the filled receptacles after passing the knife 7, to be raised whereby the protruding portion of the filling will be pressed against the underside of the plate 9 to push the fillings into proper position in the receptacles. Accordingly, this means includes a cam block 134 pivoted as at 135 on the stationary cam means 11 next to be described. The cam block 134 is provided with a cam surface 138 which is inclined upwardly in the direction of rotation (counterclockwise) of the hopper 1 and carrier 5. The lower or leading end of the cam surface 138 is contiguous with the trailing end (Fig. 19) of the main cam dwell 6d, whereas the trailing end of the cam surface 138 is contiguous with the leading end of a cam surface 140 of the cam means 11. Thus, the cam followers will ride off the dwell 6d of the cam 6 onto the upwardly inclined surface 138, thereby elevating the members 4 so that the filled receptacles will be raised to cause the surplus filling to be pressed into the receptacles by the plate 9 as shown in Fig. 12.

Means is provided whereby the cam block 134 will be adjusted in keeping with the adjustment of the main cam 6 to insure the proper elevation of the filled receptacles toward the plate 9 for each adjustment of the cam 6. For this purpose the under side of the trailing end of the cam track 6a is provided with a projection 142 having a reduced portion 143 formed with a rounded end 144 seated in a recess 145 in the cam block 134, to permit limited pivotal movement of the block. Thus, as the cam 6 is adjusted, the cam block 134 will be tilted to present the cam surface 138 in proper position for the purpose above described.

*Cam means 11 for lowering filled receptacles from the hopper pockets*

This cam means, generally designated 11, is shown in Figs. 3, 14 and 18–21 as comprising an upstanding cam body member 147 bolted to the frame plate 101 in the gap between the trailing and leadings ends of the arcuate cam track 6a. On its upper edge the cam body 147 is provided with a laterally projecting flange 149, the lower side of which forms a cam surface 150. The cam surface 140 is formed on the upper surface of a similar lateral flange 151 formed on the cam body member 147 in opposed and spaced relation to the flange 149, whereby the cam followers 125 may pass between these opposed flanges.

As shown in Fig. 19, the opposed cam surfaces 140 and 150 are substantially correspondingly downwardly inclined from the leading ends to the trailing ends thereof, that is, from cam means 11 to the leading end of the cam track 6a. Both of these surfaces are downwardly inclined sharply to a point 153 approximately centrally of their ends and from that point have a more gradual inclination to a point spaced inwardly from the trailing ends thereof, where they are formed with more sharply inclined portions 154. As shown in Fig. 19, the trailing end of the cam surface 140 terminates slightly above the plane of the leading end of the cam track 6a. As the cam followers 125 reach the upper end of the cam surface 138, the receptacle supporting member 4 (Fig. 12) and the filled receptacles thereon are moved to maximum elevation in the pockets 1b beneath the plate 9 thereby pressing the surplus filling into the receptacles.

As the followers 125 move between the cam surface 140 and 150 they will ride downwardly on the lower cam surface 140 as the members 4 and packed receptacles thereon gravitate to lower the receptacles. Figs. 13 and 15 show how each receptacle is lowered during this movement and Fig. 14 shows how each receptacle is completely removed from its associated hopper pocket 1b as takes place when the associated cam follower 125 has moved off cam surface 140. Thus, the receptacles are lowered clear of the pockets 1b at the zone designated Z in Fig. 4, this being in advance of the point at which the star wheel 53 moves the receptacles from the carrier 5 onto the chute 56.

The upper cam surface 150 acts as a safeguard to assure that the cam followers will be lowered, in the event the receptacles become stuck or so engaged in the hopper pockets as to resist lowering movement of the members 4 as intended by operation of the cam means 11. In this event the cam followers will ride against the upper surface 150 and cause the members 4 to be retracted to lower the receptacles from the hopper pockets 1b.

*Receptacle engaging cam means for assisting in removing receptacles from the hopper*

As shown in Figs. 4, 13, 15 and 16, this means cooperates with the cam means 11 to cause the receptacles to be withdrawn from the hopper pockets in advance of the star wheel 53 for removing the filled receptacle from the carrier 5. Accordingly, the means 11a includes a stripper bar 155 supported in the path of the receptacles by means of brackets 156 mounted on the shelf 47. The bar 155 is inclined downwardly from its leading end to its trailing end in correspondence to the inclination of the cam surfaces 140 and 150 of the cam means 11, and provides a cam surface 157 along its under side. As the receptacles are advanced past the leading end of the bar 155, the receptacle flanges 44 will ride under the bar and against the cam surface 157 as clearly shown in Figs. 13, 15 and 16, thereby moving and guiding the receptacles downwardly in an inclined path while the cam means 11 causes the members 4 to be correspondingly lowered. Thus, the cam bar 155 assures that the receptacles will be removed from the pockets 1b so that the star wheel 53 may remove the receptacles from the carrier 5.

*Automatic safety controls*

It is necessary that the empty receptacles be positioned in the pockets 1b of the hopper during operation of the machine as otherwise the filling material will drop through the pockets and be wasted. Accordingly, means is provided for stopping the machine in the event of failure of the feed of empty receptacles during operation of the machine.

It is also desired to stop the operation of the machine in the event a filled receptacle fails to be properly withdrawn from a hopper pocket 1b preliminary to the removal of the filled receptacle from the carrier 5. For this purpose a second safety control is provided.

These safety controls are embodied in electrical circuits (Fig. 17) for the motors M and N.

As shown in Fig. 5, a switch 160 is mounted on the empty receptacle feed chute 45 to control the operation of the motors M and N. A spring loaded lever 161 fulcrumed as at 162 on the chute 45 and operatively connected with the switch 160, is positioned in the path of the empty receptacles advancing through the chute. As long as the receptacles are being fed to the machine, the lever 161 is maintained by contact with successive receptacles, in position such that the switch 160 closes the motor circuits, but will move to actuate the switch for stopping the motors, in the event of failure of the feed of receptacles through the chute 45 past the lever 161.

As shown in Fig. 4, a switch 163 is mounted on the shelf 47 so as to be actuated by means of a lever 165 which extends beneath the hopper pockets (Fig. 14) at the zone Z adjacent and in advance of the star wheel 53 (Fig. 4). Should a filled receptacle become stuck in a hopper pocket when it reaches the zone Z, the receptacle will contact and move the lever 165 to operate the switch 163 for shutting off the motors M and N.

As shown in Fig. 17, the motor M for rotating and knife 7 is connected in a circuit 167 fed from line conductors 168 leading from a source of electrical energy not shown. A switch 169 controls the circuit 167, being operated by a solenoid 170.

A circuit 171 is fed from the line conductors 168 for operating the motor N for driving the hopper 1 and carrier 5 as a unit, being controlled by a switch 172 operated by a solenoid 173.

A circuit 174 taken off the line conductors 168, has connected in series therein, the switch 160, the switch 165, a manually operable starting switch 176 and the solenoid 173 for switch 172, respectively. The solenoid 170 for the switch 169 is connected in series in a circuit 177 taken off the circuit 171 at a point in the latter controlled by the switch 172.

The solenoid 69 for actuating the oiler valve 68 is connected in series in a circuit 178 taken off the circuit 171 at a point controlled by the switch 172. A switch 180 (Figs. 2 and 7) actuated by the clutch operating lever 120 is connected (Fig. 17) in series in the circuit 178 for controlling the solenoid 69. Thus, when the outer end of the lever 120 is lifted to engage the clutch 119, the switch 180 will be closed, thereby operating the solenoid 69 to open the oil valve 68, whereby oil will drop into the receptacles C as they are advanced under the spout 76 as shown in Fig. 5.

Should the feed of empty receptacles past the spring-loaded lever 161 in the chute 45, be stopped so that the lever does not contact one of the receptacles, the lever will move to open the normally closed switch 160, thereby deenergizing the solenoid 173 whereby the switch 172 will open the circuit 171 and stop the main motor N. When the switch 172 opens the circuit 171, it also opens the circuit 177 for the solenoid 170 thereby causing the switch 169 to open the circuit 167 for the knife motor N. As the circuit 178 for the oiler solenoid 69 is taken off the circuit 171, it is apparent that the circuit 178 will be opened when circuit 171 is opened, thereby closing the oiler valve 68 and stopping the operation of the oil feed means P.

As the normally closed switch 165 is in series with the normally closed switch 160 in the circuit 174, it is apparent that if a filled receptacle becomes stuck in the hopper at the zone Z, it will contact and move the lever 165, the switch 165 will open and cause the circuits 174, 171, 167, 177 and 178 to open in the same manner as when the switch 160 is opened.

Before the filling material is fed into the hopper 1, the motors M and N are started by closing the starting switch 176 (Fig. 17) after which the outer end of the clutch lever 120 (Fig. 7) is raised to engage the clutch 119 so that the hopper 1 and carrier 5 will be rotated as a unit in a counterclockwise direction. At this time there is a continuous line of empty receptacles C in the feed chute 45 up to the star wheel 46, the lever 161 for the control switch 160 on the chute 45 being then engaged with one of the receptacles in this line to maintain the switch 160 closed.

As the hopper 1 and carrier 5 commence to rotate, the star wheel 46 moves the receptacles successively onto the tops of the supporting members 4 while the members 4 are beneath the plate 9 and are being advanced toward the trailing end T of the plate 9. When the member 4 onto which the first receptacle has been deposited, moves past the trailing end T of the plate 9, the cam follower 125 associated with this member 4 rides upward on the inclined cam surface 6e of the cam track 6a onto the dwell 6d thereby elevating the member 4 and positioning the receptacle C within the associated hopper pocket 1b as shown for example in Fig. 9 and maintaining it in this position in the pocket throughout the length of the dwell. The successive receptacles are correspondingly elevated into the pockets and when a number thereof occupy successive pockets over the arcuate zone between the end T of plate 9 and the feed assisting means W, the filling material may be deposited into the hopper at this zone. As the filling material is fed to the hopper it will gravitate into the successive pockets 1b and pass therethrough into the receptacles therein during the angular movement of the receptacle about the axis of the hopper.

The feed assisting means W operates through its reciprocable fingers 85 to move into and out of the pockets 1b and loosen the pieces of the filling material preventing clogging and consequent failure of gravitational feed into the receptacles.

By the time the receptacles reach the knife 7 they will have been filled, with the filling extending above the upper ends of the receptacles according to the spacing of these upper ends from the plane of the knife 7 as determined by the adjustment of the cam 6.

The knife 7 is rotated in a counterclockwise direction and in extending through the slot 23 into the hopper pockets, will cut through the filling material as the pockets pass the knife, thereby determining the filling for each receptacle.

When the filled receptacles move past the knife and beneath the plate 9, the leading end L of the plate separates the filling in the receptacles from the filling material that remains in the upper portions of the pockets above the plane of the cuts made by the knife. Thus, as the receptacles pass under the plate 9 the feed thereto from the pockets 1b is shut off and the material in the pockets above the plate 9 will be carried around on the plate until it clears the trailing end T of the plate, where it will drop into the receptacles passing this trailing end.

As the filled receptacles having the surplus filling as determined by the knife 7, successively pass under the plate 9, the cam followers 125 will ride up on the cam surface 138 thereby lifting the members 4 and the receptacles so that the surplus filling is pressed into the receptacles by contact with the under side of plate 9. This pressing operation takes place during but a short angular movement of the receptacle after which the receptacles are progressively retracted from the pockets as the cam followers 125 ride downwardly on the cam surface 140 of cam 11 due to the gravitational movement of the members 4.

When the receptacles reach the zone Z, the cam 11 and stripping cam means 11a will have removed the receptacles from the pockets 1b into the position shown in Fig. 14, where the star wheel 53 operates to remove the receptacles successively from the supporting members 4 and onto the chute 56. In this connection it should be noted that when each filled receptacle reaches the point (zone R in Figs. 1 and 4) where it is removed by the star wheel 53, the member 4 supporting the receptacle has its cam follower 125 disposed upon the portion of the cam 11 (see Fig. 19) between the point 153 and the sharply inclined cam portions 154. This, as shown in Fig. 14, causes the member 4 to be so elevated that the bottom of the receptacle is slightly above the plane of the upper surface of the shelf 47, thus assuring that the receptacle will slide freely onto the shelf 47. However, when each supporting member 4 moves past the zone R toward the point where the star wheel 46 feeds the empty receptacles onto the members 4, the cam follower 125 will ride downwardly relative to the sharply inclined cam portions 154, thereby lowering the member 4 so that the upper surface thereof as shown in Fig. 22, will be slightly below the upper surface of the shelf 47. This assures that the empty receptacles will be properly moved onto the members 4.

It should be noted that the knife 7 cuts through the filling material, for example pieces of tuna or other fish, in the direction of advance of the receptacles and tends to direct or bend the cut ends of the filling in this direction. However, the leading edge L of the thin pressure plate 9 upon encountering these cut ends will tend to move them in the opposite direction, thereby straightening the cut ends and avoiding a "washed over" appearance of the packed fillings in the receptacles.

As explained hereinbefore, under the heading Automatic Safety Controls, should the receptacle feed be interrupted while the machine is in operation, the motors M and N will be stopped to prevent waste of the filling material through any of the hopper pockets not occupied by a receptacle. Moreover, should a receptacle become stuck in a pocket at or near the zone Z where it should be clear of the pockets, the safety switch 163 is operated by the lever 165 to stop the operation of the machine.

Thus, it will be seen that the present invention provides a novel, simple, effective and efficient receptacle filling machine especially adapted to the filling of receptacles with fish fillets or like frangible chunk material and provides synchronous and interdependently actuated instrumentalities with safety devices to insure automatic control responsive to various supply factors.

We claim:

1. In apparatus for filling receptacles, a movable hopper having a series of discharge pockets for containing material to be discharged into said receptacles, said pockets having discharge openings, receptacle supporting means, means operating said supporting means to position the receptacles within and remove them from said openings during movement of said hopper, and a knife positioned to extend into said pockets to cut across the material therein during said movement of said hopper.

2. In apparatus for filling receptacles, a movable hopper having a series of discharge pockets for containing material to be discharged into said receptacles, said pockets having discharge openings, receptacle supporting means movable for positioning the receptacles within and removing them from said openings, means mounting said hopper and said receptacle supporting means for corresponding movement, means for operating said receptacle supporting means, and means operable for adjusting said operating means to vary the movement of said receptacle supporting means, and a knife positioned to extend into said pockets to cut across the material therein during said movement of said hopper.

3. A receptacle filling apparatus comprising a movable hopper, a material discharge opening in said hopper, means for moving a receptacle into material receiving relation with said discharge opening, means for moving said receptacle with said hopper to receive material therein from said hopper, and a knife positioned to extend into said opening during movement of said hopper to sever material deposited in said receptacle at a predetermined distance with respect to the top edge of the receptacle.

4. A receptacle filling apparatus comprising of rotatable material hopper, a circular series of material discharge openings in said hopper, means for moving a succession of receptacles into successive material receiving relation with said discharge openings, means for rotating said receptacles with said hopper to receive material therein from said hopper, and a rotatable knife positioned to extend into said openings above the lower ends of said openings to sever material deposited in said openings at a predetermined distance with respect to the top edges of the receptacles.

5. A receptacle filling apparatus comprising a rotatable material hopper, a circular series of material discharge openings in said hopper, means for moving a succession of receptacles into material receiving relation with said discharge openings, means for rotating said receptacles with said hopper to receive material therein from said hopper, a rotatable knife positioned to extend into said openings above the lower ends of said openings to sever material deposited in said receptacles at a predetermined distance above the top edges of the receptacles, and means adjustable for varying the distance between the knife and the top edges of the receptacles.

6. In receptacle filling apparatus, a movable series of receptacle supports, means for moving said supports in a predetermined path with receptacles thereon, means providing a plurality of pockets for discharging material into said receptacles during said movement of said receptacles, a knife positioned to extend into said pockets above the discharge end of said pockets for severing the material therein at a predetermined distance with respect to the top of said receptacles, and means for varying the distance between said knife and the tops of receptacles carried by said supports.

7. In receptacle filling apparatus, a rotatable circular series of receptacle supports, means for supplying material to receptacles mounted on said supports, said means including pockets through which said material is discharged, means for rotating said supports with the receptacles thereon in position to receive the material from said pockets, and a rotating knife mounted to extend into and across said pockets at a predetermined distance with respect to the top of said receptacles while the latter are in said position on said supports.

8. In apparatus for filling receptacles, means for moving a receptacle through a path of travel, a knife arranged in said path of travel at a plane above that of the top of a receptacle moved in said path to sever material at a predetermined point above the top of said receptacle, a pressure plate arranged in said path of travel beyond said knife, and means for moving the receptacle vertically in said path toward said plate to urge into the receptacle the material protruding from the top thereof.

9. In apparatus for filling receptacles, means for continuously moving a series of receptacles through a circular path of travel, means for depositing material in said receptacles as they are moved through said circular path of travel, a rotatable knife arranged in said path of travel at a plane above the top of receptacles moved in said path to sever material at a predetermined point above the tops of said receptacles, a pressure plate arranged in said path of travel beyond said knife, means for moving receptacles vertically in said path and as an incident of travel in said path toward said plate to urge material protruding from the tops thereof within the confines of said receptacles, and means for effecting relative vertical adjustment between said knife and said means for moving said receptacles vertically to vary the overfill to be urged by said plate within the confines of the receptacles.

10. In apparatus for filling receptacles, a rotary hopper having a series of discharge openings, forming open pockets, a rotary carrier having a plurality of receptacle supporting members beneath and in alignment with said pockets, movable between a position in which the receptacles are disposed for filling within said pockets and a position in which the filled receptacles are removed from said pockets, means mounting said hopper and said carrier for corresponding rotation, means for moving said supporting means to position said receptacles in said pockets during rotation of said hopper and said carrier, a knife positioned to extend into each pocket that passes a given point in the path of movement of said pockets for cutting across the material in the pockets, and means operable beyond said given point during rotation of said hopper and carrier for moving said supporting members to remove the filled receptacles from said pockets.

11. In apparatus for filling receptacles, a rotary hopper having a series of discharge openings forming open pockets, a rotary carrier having a plurality of receptacle supporting members movable beneath and in alignment with said pockets between a position in which the receptacles are disposed for filling within said pockets and a position in which the filled receptacles are removed from said pockets, means rotatably mounting said hopper and said carrier, means for moving said supporting members to position said receptacles in said pockets during rotation of said hopper and said carrier, a knife operable to cut across the filling material contained above the filled receptacle in each pocket that passes a given point in the path of movement of said pockets, a pressure plate extending from said knife in the direction of travel of the pockets, means for moving said supporting members to press the contents of the filled receptacles against said pressure plate during rotation of said hopper and said carrier, and means operable at a point beyond said plate for moving said supporting members to withdraw the filled receptacles from said pockets during rotation of said hopper and carrier.

12. In apparatus for filling receptacles, a rotary hopper having a series of discharge openings forming open pockets, a rotary carrier having a plurality of receptacle supporting members movable beneath and in alignment with said pockets between a position in which the receptacles are disposed for filling within said pockets and a position in which the filled receptacles are removed from said pockets, means rotatably mounting said hopper and said carrier, means for moving said supporting members to position said receptacles in said pockets during rotation of said hopper and said carrier, a rotary knife operable to cut through the filling material contained above the filled receptacle in each pocket passing a given point in the path of movement of said pockets, means for rotating said knife, a stationary pressure plate extending from said knife in the direction of movement of the pockets, means operating at a point beyond said given point for moving said supporting members to press the contents of said receptacles against said plate, as said hopper is rotated, and means for moving said supporting members to withdraw said receptacles from said pockets.

13. In apparatus for filling receptacles, a rotary hopper having a series of discharge openings forming open pockets, a rotary carrier having a plurality of receptacle supporting members movable beneath and in alignment with said pockets between a position in which the receptacles are disposed for filling within said pockets and a position in which the filled receptacles are removed from said pockets, means rotatably mounting said hopper and said carrier, means for moving said supporting members to position said receptacles in said pockets during rotation of said hopper and said carrier, a knife positioned to extend into and across each pocket that passes a given point in the path of movement of said pockets, and means adjustable for varying the extent of movement of said supporting members toward said knife.

14. In apparatus for filling receptacles, a rotary hopper having a series of discharge openings forming open pockets, a rotary carrier having a plurality of receptacle supporting members movable beneath and in alignment with said pockets between a position in which the receptacles are disposed for filling within said pockets and a position in which the filled receptacles are removed from said pockets, means rotatably mounting said hopper and said carrier, cam followers on said supporting members, means forming a cam cooperable with said followers for moving said supporting members upwardly to position said receptacles in said pocket and maintain them in such position during a part of each revolution of the hopper and said carrier, a knife operable to cut laterally through the filling material contained above the filled receptacle in each pocket passing a given point in the path of movement of said pockets, means for adjusting said cam means to vary the upward movement of said supporting member and the spacing of the upper ends of the receptacles from the plane of said knife, and cam means independent of said first named cam means, cooperable with said followers at a point in said path of movement beyond said given point for moving said supporting member to withdraw said receptacles from said pockets.

15. In apparatus for filling receptacles, a rotary hopper having a series of discharge openings forming open pockets, a rotary carrier having a plurality of receptacle supporting members movable beneath and in alignment with said pockets between a position in which the receptacles are disposed for filling within said pockets and a position in which the filled receptacles are removed from said pockets, means rotatably mounting said hopper and said carrier, cam followers on said supporting members, means forming a cam cooperable with said followers for moving said supporting members upwardly to position said receptacles in said pocket and maintain them in such position during a part of each revolution of the hopper and said carrier, a knife operable to cut laterally through the filling material contained above the filled receptacle in each pocket passing a given point in the path of movement of said pockets, means for adjusting said cam means to vary the upward movement of said supporting member and the spacing of the upper ends of the receptacles from the plane of said knife, a plate extending from said knife in the direction of movement of said pockets, a second cam means including a cam member coextensive with the first named cam means and cooperable with said followers for moving said supporting member to press the contents of the receptacle against said plate during rotation of said hopper and carrier, and a third cam means cooperable with said followers for moving said supporting members subsequent to said pressing of said contents, for withdrawing the filled receptacles from said pockets during rotation of said hopper and said carrier.

16. In apparatus for filling receptacles, a rotary hopper having a series of discharge openings forming open pockets, a rotary carrier having a plurality of receptacle supporting members movable beneath and in alignment with said pockets between a position in which the receptacles are disposed for filling within said pockets and a position in which the filled receptacles are removed from said pockets, means rotatably mounting said hopper and said carrier, cam followers on said supporting members, means forming a cam cooperable with said followers for moving said supporting members upwardly to position said receptacles in said pocket and maintain them in such position during a part of each revolution of the hopper and said carrier, a knife operable to cut laterally through the filling material contained above the filled receptacle in each pocket passing a given point in the path of movement of said pockets, means for adjusting said cam means to vary the upward movement of said supporting member and the spacing of the upper ends of the receptacle from the plane of said knife, a plate extending from said knife in the direction of movement of said pockets, a second cam means including a cam member coextensive with the first named cam means and cooperable with said followers for moving said supporting member to press the contents of the receptacle against said plate during rotation of said hopper and carrier, means pivotally mounting said cam member, means connecting said cam member with said adjustable cam means for said cam member responsive to adjustment of said adjustable cam means.

17. In apparatus for filling receptacles, a frame, a hopper mounted to rotate on said frame, having inner and outer continuous side walls, a bottom and plurality of discharge openings forming a series of open pockets for containing the filling material deposited between said walls; said hopper having a circumferential slot therein leading into said pockets at a point intermediate the ends of the pockets, a plate stationarily mounted on said frame having a portion of limited arcuate extent in the direction of movement of said pockets, projecting through said slot for shutting off the feed of material through said pockets as they move past said plate, a carrier mounted to rotate on said frame beneath said hopper, including receptacle supporting members aligned with said pockets and movable for positioning the receptacles in said pockets and for withdrawing said receptacles from said pockets; means for feeding empty receptacles onto said supporting members at a point beneath said plate during rotation of said carrier and hopper, means operable at a point beneath said plate and adjacent said feeding means for removing the filled receptacles from said supporting members, a knife mounted on said frame and extending through said slot for intersecting the pockets at a point adjacent said plate, means operable during rotation of said carrier and hopper for moving said receptacle supporting members as they advance from said plate, to elevate the empty receptacles into a filling position in said pockets and maintain them therein throughout the movement of the receptacles to said knife, said knife being positioned for cutting across the material contained above the filled receptacle in each pocket intersected by the knife, means operable when the receptacles pass said knife for moving said supporting members to press the contents of the receptacles against said plate and means for moving said supporting members to withdraw the filled receptacle from said pockets at a point between said last named means and said means for removing the filled receptacles from said supporting members.

18. In apparatus for filling receptacles, a frame, a hopper mounted to rotate about an axis on said frame, having a plurality of discharge openings in a circular series about said axis, a plate stationarily mounted on said frame having a portion of limited extent in the direction of movement of said openings, projecting into said hopper for shutting off the feed of filling material through said openings as the latter are advanced past said plate, a carrier rotatably mounted on said frame beneath said hopper, including a plurality of receptacle supporting members movable to extend the receptacles into the hopper through the discharge ends of said openings and to withdraw the filled receptacles therefrom, and means for so moving said receptacle supporting members during rotation of said hopper and said carrier.

19. In apparatus for filling receptacles, a frame, a hopper mounted to rotate about an axis on said frame, having a plurality of discharge openings in a circular series about said axis, a plate stationarily mounted on said frame having a portion of limited extent in the direction of movement of said openings, projecting into said hopper for shutting off the feed of filling material through said openings as the latter are advanced past said plate, a carrier rotatably mounted on said frame beneath said hopper, including a plurality of receptacle supporting members movable to extend the receptacles into the hopper through the discharge ends of said openings and to withdraw the filled receptacles therefrom, means for so moving said receptacle supporting members during rotation of said hopper and said carrier, and a knife on said frame extending into said hopper at a point in advance of said plate for cutting across the filling material extending above the filled container in each opening passing said knife.

20. In apparatus for filling receptacles, a frame, a hopper mounted to rotate about an axis on said frame, having a plurality of discharge openings in a circular series about said axis, a plate mounted on said frame having a portion of limited extent in the direction of movement of said openings, projecting into said hopper for shutting off the feed of filling material through said openings as the latter are advanced past said plate, a plurality of receptacle supporting members movable to extend the receptacles into the hopper through the discharge ends of said openings and to withdraw the filled receptacles therefrom, means for so moving said receptacle supporting members during rotation of said hopper, and a rotary knife mounted on said frame and extending into said hopper at a point contiguous one end of said plate operating to cut across the filling material above the filled container in each opening that passes said knife.

21. In apparatus for filling receptacles, a rotary hopper forming an annular chamber provided with a series of open pockets adapted to have the filling material pass therethrough into the receptacles, said hopper having a circumferential slot intersecting said pockets, means for moving empty receptacles into said pockets during rotation of said hopper, means for maintaining the receptacles in said pockets during a part of each revolution of said hopper, a knife extending into said slot for cutting through the filling material in each pocket passing the knife, and means for removing the filled receptacles from said pockets after they pass the knife.

22. In apparatus for filling receptacles, a rotary hopper forming an annular chamber provided with a series of open pockets adapted to have the filling material pass therethrough into the receptacles, said hopper having a circumferential slot intersecting said pockets, means for moving empty receptacles into said pockets during rotation of said hopper, means for maintaining the receptacles in said pockets during a part of each revolution of said hopper, a knife extending into said slot for cutting through the filling material in each pocket passing the knife, a pressure plate extending into said slot beyond said knife, means for moving the receptacles after they pass said knife, toward said plate to press the fillings into the receptacles, and means for removing the filled receptacles from said pockets following said movement toward said plate.

23. In apparatus for filling receptacles, a rotary hopper forming an annular chamber provided with a series of open pockets adapted to have the filling material pass therethrough into the receptacles, said hopper having a circumferential slot intersecting said pockets, means for moving empty receptacles into said pockets during rotation of said hopper, means for maintaining the receptacles in said pockets for the filling of the receptacles during a part of each revolution of said hopper, a knife extending into said slot for cutting through the filling material in each pocket passing the knife, a pressure plate extending into said slot contiguous with and in the plane of said knife, means for moving said receptacle upwardly toward said plate to cause the fillings in the receptacle to be pressed in the receptacles, and means for removing the filled receptacles from said pockets after the receptacles have been moved upwardly toward said plate.

24. In apparatus for filling receptacles, a rotary hopper having a series of open pockets adapted to have filling material pass therethrough into the receptacles, a carrier mounted to rotate with and below said hopper including a plurality of receptacle supporting members movable to position receptacles in and remove them from said pockets, a pressure plate mounted to intersect the pockets above the receptacles therein at one point in the path of movement of the pockets, means for moving the said receptacle supporting members to position the receptacles within said pockets during rotation of said hopper and carrier, including a vertically adjustable cam, and cam followers on said members, means for adjusting said cam to vary the movement of said receptacle supporting members, a second cam cooperable with said followers for moving said supporting members upwardly when beneath said plate whereby said plate will press the filling material into the receptacles, and a third cam cooperable with said followers for removing the filled receptacles from said pockets.

25. In apparatus for filling receptacles, a rotary hopper having a series of open pockets adapted to have filling material pass therethrough into the receptacles, a carrier mounted to rotate with and below said hopper, including a plurality of receptacle supporting members movable to position receptacles in and remove them from said pockets, a pressure plate mounted to intersect the pockets above the receptacles therein at one point in the path of movement of the pockets, means for moving the said receptacle supporting members to position the receptacles within said pockets during rotation of said hopper and carrier, including a stationary and vertically adjustable cam, and cam followers on said members, means for adjusting said cam to vary the position of the receptacles in said pockets, a second cam cooperable with said followers for moving said supporting members upwardly when beneath said plate whereby said plate will press the filling material into the receptacles, a third cam cooperable with said followers for removing the filled receptacles from said pockets, and means connecting said first named cam and said second cam whereby the second cam will be adjusted responsive to adjustment of the first named cam.

26. A receptacle filling apparatus including a movable hopper, means for mounting a receptacle in material receiving relation with said hopper, means for moving said receptacle with said hopper during the filling operation, a material feeding assistor for said hopper comprising an assistor finger past which said hopper is moved, and means for moving said finger with respect to said hopper in a path of travel fixed with respect to the movement of said hopper to assist the discharge of material from said hopper to said receptacle.

27. Receptacle filling apparatus including a rotating hopper, means for mounting a receptacle in material receiving relation with said hopper, a material feeding assistor for said hopper comprising an assistor finger past which said hopper is moved, and means for moving said finger with respect to said hopper in a vertical path of travel fixed with respect to said hopper rotation to assist the discharge of material from said hopper to said receptacle.

28. Receptacle filling apparatus including a continuously rotatable hopper, having a plurality of material discharge openings, means for mounting receptacles in material receiving relation with said openings, means for moving said receptacles with said hopper during the filling operation, a material feeding assistor member past which said openings are successively moved, and means for moving said assistor member into and out of said openings during the rotary movement of said hopper.

29. Receptacle filling apparatus including, a rotatable hopper having a circular series of discharge openings, means for continuously rotating said hopper, means for mounting receptacles in material receiving relation with said hopper, a material feeding assistor member mounted independently of said hopper, and means for moving said member into successive discharge openings of the rotating hopper.

30. In a receptacle filling apparatus including, a rotatable hopper having a circular series of discharge openings forming pockets, means for successively moving receptacles into said pockets, means for filling each pocket with a greater amount of filling material than the capacity of each receptacle, means for supplying measured increments of another material to successive receptacles preliminary to the positioning of said receptacles in said pockets.

31. In receptacle filling apparatus, a continuously rotatable hopper having a circular series of material discharge openings forming pockets, means for continuously moving receptacles into said pockets, means for moving said receptacles and hopper in unison, means for filling each pocket with material in excess of the amount to be placed in each receptacle, means for delivering a measured increment of salt to each receptacle preliminary to movement of the receptacle into one of said pockets and means for supplying a liquid ingredient to each receptacle before moving said receptacles into said pockets.

32. A receptacle filling apparatus including a movable hopper, means for moving a succession of receptacles into successive material receiving relation with said hopper, said hopper having a series of open pockets into which said receptacles are moved by said means to receive material deposited in said pockets, means for moving said hopper and receptacles in unison, means for delivering receptacles to said means for moving receptacles into successive relation with said hopper, and means responsive to receptacles in said last mentioned means for controlling said first mentioned means.

33. In a receptacle filling machine, the combination of a rotatable receptacle carrier adapted through one portion of its revolution to move a receptacle in a predetermined path of travel and a control device including a lever located adjacent to but spaced from said path of travel in position to be engaged and moved by a receptacle moved by said carrier in a path other than said predetermined path, said device stopping rotation of said carrier responsive to said movement of said lever.

34. A receptacle filling apparatus including a movable material hopper having open pockets, means for moving a succession of receptacles into said pockets, means for moving said hopper with said receptacles in unison in a predetermined path, means for removing said receptacles from said pockets at a predetermined point in said path, and a control device operable to stop the operation of the apparatus responsive to contact with a receptacle which the removing means may fail to remove from one of said pockets.

35. In receptacle filling apparatus, a rotatable hopper having a circular series of discharge pockets open at both ends and separated by walls inclined from the upper ends of said pockets in the direction of discharge of material through said pockets, means for rotating said hopper, and means for mounting receptacles within said pockets.

36. In receptacle filling apparatus, a rotatable hopper including a circular series of discharge pockets having enlarged intake ends and walls inclined to form sharp edges between said intake ends, and means supporting receptacles within said pockets to receive material deposited therein.

37. In receptacle filling apparatus, a rotatable hopper including a circular series of discharge pockets having enlarged and conical intake ends and walls inclined to form sharp edges between said intake ends, and means supporting receptacles within said pockets.

38. In receptacle filling apparatus, a rotatable hopper including a circular series of discharge openings having portions enlarged in the direction of rotation of the hopper, means for supporting receptacles in position to receive material discharged from said openings, a feed-assisting member past which said openings are movable, and means for moving said member into and out of said enlarged portion of said opening during rotation of said hopper.

39. In receptacle filling apparatus, a rotatable hopper having an annular chamber adapted to have material deposited therein and provided with a bottom wall formed with a circular series of discharge openings enlarged at their intake ends; portions of said bottom wall between said openings being inclined to form sharp edges separating said intake ends, and means for supporting receptacles in said openings at points spaced from said inclined portions.

40. In receptacle filling apparatus, a rotatable hopper having opposed side walls and a bottom wall between said side walls and forming therewith an annular chamber adapted to have material deposited therein, said bottom wall having a circular series of discharge openings, portions of said bottom wall forming sharp edges separating the intake ends of said openings and being inclined divergently from said edges, and means for supporting receptacles in position to receive material discharged from said openings.

41. In receptacle filling apparatus, a rotatable hopper having opposed side walls and a bottom wall between said side walls and forming therewith an annular chamber adapted to have material deposited therein, said bottom wall having a circular series of discharge openings, the portions of said bottom wall surrounding said opening forming sharp edges at the intake ends of said openings, said portions of said bottom wall converging from said edges and terminating between the ends of said openings, and means for supporting receptacles in portions of said openings below said converging portions.

References Cited in the file of this patent

UNITED STATES PATENTS

| | | |
|---|---|---|
| 587,083 | Thompson | July 27, 1897 |
| 854,075 | Burpee | May 21, 1907 |
| 1,046,762 | Fleming et al. | Dec. 10, 1912 |
| 1,579,434 | Brombaker | Apr. 6, 1926 |
| 1,594,712 | Eistentrant | Aug. 3, 1926 |
| 2,158,767 | Ayars | May 16, 1939 |
| 2,167,894 | Kotcher | Aug. 1, 1939 |
| 2,176,449 | Ayars | Oct. 17, 1939 |
| 2,261,548 | Girdley et al. | Nov. 4, 1941 |
| 2,262,662 | Ardron | Nov. 11, 1941 |
| 2,266,979 | McIlvried | Dec. 23, 1941 |
| 2,280,776 | Allen | Apr. 28, 1942 |
| 2,366,811 | Sibson | Jan. 9, 1945 |
| 2,446,762 | Hauck | Aug. 10, 1948 |
| 2,602,578 | Carruthers | July 8, 1952 |
| 2,607,521 | Broadhurst | Aug. 19, 1952 |